United States Patent
Li et al.

(10) Patent No.: US 10,612,719 B2
(45) Date of Patent: *Apr. 7, 2020

(54) TRIPOD BUTTON MECHANISM AND A TRIPOD

(71) Applicant: Guangdong Sirui Optical Co., Ltd., Zhongshan (CN)

(72) Inventors: Jie Li, Zhongshan (CN); Xiaoyun Hu, Zhongshan (CN)

(73) Assignee: Guangdong Sirui Optical Co., Ltd., Zhongshan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/896,914

(22) Filed: Feb. 14, 2018

(65) Prior Publication Data

US 2019/0003635 A1     Jan. 3, 2019

Related U.S. Application Data

(63) Continuation of application No. 15/561,022, filed as application No. PCT/CN2017/095397 on Aug. 1, (Continued)

(30) Foreign Application Priority Data

Jul. 28, 2017  (CN) .......................... 2017 1 0632425

(51) Int. Cl.
*F16M 11/24*    (2006.01)
*F16M 11/16*    (2006.01)
(Continued)

(52) U.S. Cl.
CPC ........... *F16M 11/245* (2013.01); *F16M 11/16* (2013.01); *F16M 11/242* (2013.01);
(Continued)

(58) Field of Classification Search
CPC ...... F16M 11/16; F16M 11/32; F16M 11/242; F16M 11/38; G03B 17/561; Y10T 403/32262
See application file for complete search history.

(56) References Cited

U.S. PATENT DOCUMENTS 4,317,552 A * 3/1982 Weidler ................. F16M 11/16
                                                                211/203
D269,880 S     7/1983 Iwasaki
(Continued)

FOREIGN PATENT DOCUMENTS

CN        2724048       9/2005
CN       201187673      1/2009
(Continued)

OTHER PUBLICATIONS

State Intellectual Property Office, First Office action, dated Apr. 25, 2018, 3 pages.
(Continued)

*Primary Examiner* — Bradley Duckworth
(74) *Attorney, Agent, or Firm* — Loeb & Loeb LLP

(57) ABSTRACT

A tripod button mechanism includes an angle position locking structure fixedly arranged on a body of a tripod. A button structure includes a button disposed rotatably on a leg shaft sleeve of the tripod through a first shaft. The button joint joints with the angle limitation structure to lock an opening angle of a supporting leg of the tripod. The tripod button mechanism includes a supporting structure abutting against the button when the joint joints with the limitation structure, and an extension line between the supporting position of the support structure and the joint intersects with an extension line of the supporting leg extending towards one end where the angle position locking structure is located.

17 Claims, 11 Drawing Sheets

Related U.S. Application Data 2017, which is a continuation-in-part of application No. 29/611,576, filed on Jul. 23, 2017, which is a continuation of application No. 29/609,538, filed on Jun. 30, 2017, which is a continuation of application No. 29/609,533, filed on Jun. 30, 2017.

(51) Int. Cl.
*G05G 1/04* (2006.01)
*G05G 5/05* (2006.01)
*G03B 17/56* (2006.01)

(52) U.S. Cl.
CPC .............. *G03B 17/561* (2013.01); *G05G 1/04* (2013.01); *G05G 5/05* (2013.01); *F16M 2200/024* (2013.01)

(56) References Cited

U.S. PATENT DOCUMENTS

| | | | |
|---|---|---|---|
| 4,453,686 A | 6/1984 | Ina | |
| 4,697,772 A | 10/1987 | Kosugi | |
| D333,479 S | 2/1993 | Lee | |
| 5,213,296 A * | 5/1993 | Lee | F16M 11/16 248/166 |
| 5,310,145 A * | 5/1994 | Chen | F21S 6/006 248/170 |
| 6,820,845 B2 * | 11/2004 | Nakatani | F16M 11/242 248/177.1 |
| 6,824,319 B1 | 11/2004 | Speggiorin | |
| 7,506,846 B2 * | 3/2009 | Speggiorin | F16B 7/1409 248/157 |
| D600,737 S | 9/2009 | Sudhana | |
| D607,037 S | 12/2009 | Lee | |
| 8,398,037 B2 * | 3/2013 | Johnson | F16M 11/32 248/163.2 |
| 8,636,429 B2 * | 1/2014 | Chen | F16M 11/32 396/428 |
| 8,915,409 B2 | 12/2014 | Smith | |
| 9,188,843 B2 * | 11/2015 | Li | F16M 11/16 |
| 9,417,508 B2 * | 8/2016 | Yang | F16M 11/041 |
| D807,421 S | 1/2018 | Yin | |
| 9,903,528 B1 | 2/2018 | Hatch | |
| 2003/0234327 A1 | 12/2003 | Nakatani | |
| 2005/0082444 A1 | 4/2005 | Raynaud | |
| 2008/0224000 A1 * | 9/2008 | Yang | F16M 11/16 248/188.5 |
| 2009/0250567 A1 * | 10/2009 | Raynaud | F16M 11/16 248/168 |
| 2010/0019109 A1 * | 1/2010 | Liu | F16M 11/046 248/168 |
| 2016/0116103 A1 * | 4/2016 | Gabrielli | F16M 11/041 248/125.8 |
| 2017/0146891 A1 * | 5/2017 | Chen | G03B 17/561 |
| 2017/0299726 A1 | 10/2017 | Hayashi et al. | |

FOREIGN PATENT DOCUMENTS

| | | |
|---|---|---|
| CN | 201250992 Y | 6/2009 |
| CN | 201487509 | 5/2010 |
| CN | 201547469 U | 8/2010 |
| CN | 201621442 | 11/2010 |
| CN | 201818978 U | 5/2011 |
| CN | 201853045 U | 6/2011 |
| CN | 202472212 | 10/2012 |
| CN | 203348864 | 12/2013 |
| CN | 104344171 | 2/2015 |
| CN | 204176269 | 2/2015 |
| CN | 105953055 | 9/2016 |
| DE | 102010025978 | 1/2012 |
| JP | H08121687 | 5/1996 |
| JP | 2016218283 A | 12/2016 |

OTHER PUBLICATIONS

State Intellectual Property Office, Second Office action, dated Feb. 19, 2019, 4 pages.
European Patent Office, Supplementary European Search Report, dated Oct. 10, 2018, 8 pages.
United States Patent and Trademark Office, Office action dated Oct. 22, 2018 for U.S. Appl. No. 29/611,576, 10 pages.
The Induro CLT203 is a 2 Series/3 Section carbon fiber tripod. Published date unknown, Retrieved on Jul. 4, 2018, https://www.indurogearconn/products/induro-clt203.aspx?CAWELAID=120290590000000012&catargetid=120290590000000202&cadevice-c&gclid-EAlaIQobChMitPeyttKG3AlVjFcNCh2 Ng GEAQYBSABEgKyYfDBwE, 1 page.
Sirui, R-X Series, publication date unknown, retrieved on Jul. 4, 2018, http://www.sirui.com/producttripodrx.htm, 1 page.
Feisol Travel CT-3441SB30 Rapid 4-Section Carbon Tripod with CB-30D Ball Head—Supports 44 lbs, publication date unknow, retrieved on Jul. 4, 2018, https://www.adorama.com/fect3441sb30.html, 1 page.
United States Patent and Trademark Office, Office action dated Jul. 26, 2018 for U.S. Appl. No. 29/609,533, 12 pages.
Sirui, A Series, publication date unknown, retrieved on Jul. 23, 2018, http://www.sirui.com/producttripoda.htm, 1 page.
United States Patent and Trademark Office, Office action dated Aug. 15, 2018 for U.S. Appl. No. 29/609,538, 9 pages.
Japan Patent Office, Reasons for Rejection, dated Aug. 26, 2019, 6 pages.

\* cited by examiner

TRIPOD BUTTON MECHANISM AND A TRIPOD

CROSS-REFERENCE TO RELATED APPLICATION

This application is a continuation of a U.S. Nonprovisional patent application, Ser. No. 15/561,022, filed on Sep. 22, 2017, which is a national stage application of the PCT international patent application serial number PCT/CN2017/095397, filed on Aug. 1, 2017, which claims priority to a Chinese invention patent application, serial number 20170632425.8, filed on Jul. 28, 2017, all of which are incorporated by reference in its entirety herein. The application is also a continuation-in-part of U.S. design patent applications, Ser. No. 29/611,576, filed on Jul. 23, 2017; Ser. No. 29/619,538, filed on Jun. 30, 2017; and Ser. No. 29/609,533, filed on Jun. 30, 2017, all of which are incorporated by reference in its entirety herein.

TECHNICAL FIELD

The present invention generally relates to the technical field of photographic camera equipment, and more particularly to a tripod button mechanism and a tripod.

BACKGROUND

A tripod button mechanism is used to fix a supporting leg of the photographic tripod at a certain position when a gear is adjusted, to adjust an opening angle of the supporting leg. There are many types of button mechanisms, most of which are button-type folding tripod, during the process of adjustment, a user must keep pressing the button with hands until the button is rotated to the selected gear, the button may be released, therefore, the operation is not comfortable enough and may not be quickly adjusted.

For this purpose, the inventors of the present application designed a tripod button mechanism that does not need to be operated by keeping pressing the button during the adjustment process, which has simple and compact structure and is easy to operate. The Chinese patent literature CN104344171 A discloses a tripod button mechanism, comprising an angle position locking structure being arranged on a body of a tripod; a supporting leg being rotatably connected with the angle position locking structure through a shaft sleeve; a button mechanism being arranged between the leg shaft sleeve and the angle position locking structure, and the button mechanism comprises a button having a pointed portion adapted to be engaged with the angle position locking structure and a button seat for jointing the button with the leg shaft sleeve, wherein, the button is hinged to the button seat through a first shaft. When the supporting leg is fixed at a certain position, one side of the button engages with the angle position locking structure, and the bottom of the other side of the button abuts against the button seat, and the two positions of the button serve as the stress points to keep the supporting leg at this gear. However, the inventors of the present application have found the following problems when using the tripod button mechanism: 1. the acting force that the button is subjected to, when locking the supporting leg to keep at a gear, allows the button to have a tendency of rotating towards a direction away from the angle position locking structure, while it is easy to slip between the button and the angle position locking structure under this tendency, resulting in gear-off of the supporting leg, reducing the supporting stability of the supporting leg; 2. since it is easy to slip between the button with this structure and the angle position locking structure, the angle position locking structure is selected as a ratchet mechanism, as the pawls are tilting downward, which produces a downward force, and the downward force enhances the downward force applied by the angle position locking structure to the pointed portion by means of the engagement between the pawls and the pointed portion of the button, so as to reduce the likelihood of slipping, which not only increases the force of the angle position locking structure, improves the structural strength requirement of the angle position locking structure, but also makes the processing complicated and the manufacturing costs high, since each pawl of the ratchet needs to be milled one by one through a milling cutter during the manufacturing process of the pawls.

SUMMARY

Therefore, the technical problem to be solved by the present invention is how to overcome the defects of the buttons in the prior art, which are easy to slip between the button and the angle position locking structure, resulting in a decrease in the supporting stability of the supporting leg of the tripod and high cost of the angle position locking structure, thereby providing a tripod button mechanism for facilitating the stability of the supporting leg of the tripod and reducing the cost of the angle position locking structure.

And the present invention further provides a tripod having the tripod button mechanism described above.

The technical solutions adopted by the present invention are provided as follows:

A tripod button mechanism comprises an angle position locking structure, which is fixedly arranged on a body of a tripod; a button structure, comprising a button disposed rotatably on a leg shaft sleeve of the tripod through a first shaft, wherein, the button has a joint adapted for jointing with a limitation structure of the angle position locking structure, and the joint joints with the limitation structure to lock an opening angle of a supporting leg of the tripod; and further comprising a supporting structure; wherein, the supporting structure abuts against the button when the joint joints with the limitation structure, and an extension line of a connection line between the supporting position of the support structure and the joint intersects with an extension line of the supporting leg extending towards one end where the angle position locking structure is located, which causes the supporting structure to apply an acting force to the button to allow the button to have a tendency of rotating towards the angle position locking structure.

The supporting structure comprises the first shaft, and when the joint joints with the limitation structure, an extension line of a connection line between an axial line of the first shaft and the joint intersects with an extension line of the supporting leg extending towards one end where the angle position locking structure is located.

The joint is formed by the button being bended downward and towards one end of the angle position locking structure, with a bending position being in the form of a circular transition structure.

The button further comprises a button seat fixedly arranged on the leg shaft sleeve, and the button is rotatably disposed on the button seat through the first shaft.

The button is formed with a clearance space for preventing the button from abutting against the button seat during rotation.

The clearance space is a circular notch formed on one side of the button away from the angle position locking structure.

The joint is in plane contact with the limitation structure.

The tripod button mechanism further comprises a biasing structure for reposition, adapted for acting a biasing force on the button to rotate the button in a direction of jointing with the limitation structure, to reposition the button.

When the joint joints with the limitation structure, an intersection angle is formed by a connection line between a supporting position of the supporting structure and the joint and a straight line along which the biasing structure applies the biasing force is an acute angle.

The tripod button mechanism further comprises a button automatic reposition structure, for automatically repositioning the button from the supporting structure; wherein, the button automatic reposition structure comprises a trigger portion, formed on one side of the button that faces the angle position locking structure, and a blocking portion, disposed on the angle position locking structure; during the process of opening the supporting leg, a torque reacted by the blocking portion on the trigger portion is greater than a torque that the biasing force acts on the button, and both of the torques have opposite directions.

The trigger portion is elongated, and the portion where the trigger portion is in contact with the blocking portion is a plane.

The blocking portion is a first limitation structure on the angle position locking structure in the opening direction of the supporting leg.

The angle position locking structure is a profiled gear, which is provided with teeth extending in a radial direction of the profiled gear.

The teeth are arc teeth.

The teeth have a circular transition structure at a cusp of the teeth.

A top portion of the profiled gear is in the form of a circular arc surface, so that the trigger portion abuts against the blocking portion, and the joint of the button is caused by the button automatic reposition structure to snap onto the circular arc surface.

A tripod comprises the tripod button mechanism.

The technical solution of the present invention has the following advantages:

The tripod button mechanism provided by the present invention comprises an angle position locking structure, which is fixedly arranged on a body of a tripod, a button structure disposed on a leg shaft sleeve of the tripod, and a supporting structure. And the button structure comprises a button disposed rotatably on a leg shaft sleeve of the tripod through a first shaft, which is engageable with the angle position locking structure. Wherein, the button has a joint for jointing with a limitation structure of the angle position locking structure. When the joint joints with the limitation structure, an opening angle of a supporting leg of the tripod is locked and no longer changes. And the supporting structure abuts against the button in a state where an opening angle is locked to provide a supporting force for the button, and the joint joints with the limitation structure. Further, an extension line of a connection line between the supporting position of the support structure and the joint intersects with an extension line of the supporting leg extending towards one end where the angle position locking structure is located, that is, the supporting force provided by the support structure for the button is directed to the extension line of one end of the supporting leg extending towards one end where the angle position locking structure is located, which allows the button to have a tendency of rotating towards the angle position locking structure, and the tendency makes the jointing of the button and limitation position more closely, and it is not easy to slip and gear-off between the joint and the limitation structure, and the supporting leg is more stable. In addition, the tripod button mechanism of the present invention makes the jointing between the joint and the limitation structure more compact and stable by adjusting the supporting structure, and it is no longer necessary to apply a downward force to the joint through the assistance of the angle position locking structure, reducing the design requirements and structural strength requirements to the angle position locking structure itself, and there is no need to adopt the ratchet mechanism with complex processing technology and high cost, it is conducive to reducing the production cost of the tripod as a whole, and provides market competitiveness of the product.

The tripod button mechanism provided by the present invention, wherein, the supporting structure comprises a first shaft, when the joint joints with the limitation structure, an extension line of a connection line between an axial line of the first shaft and the joint intersects with an extension line of the supporting leg extending towards one end where the angle position locking structure is located. The button not only does reciprocating rotation around the first shaft, but also uses the first shaft as a supporting structure, and the first shaft provides supporting for the button in a state where the joint joints with the limitation structure to allow the button to have a tendency of rotating towards the angle position locking structure, which makes the jointing between the button and limitation position more compact, and it is not easy to slip and gear-off between the joint and the limitation structure, and the supporting leg is more stable. Secondly, the first shaft is used as a supporting structure, which enhances the usability of the button by changing the force state of the existing structure, there is no need to provide a separate component as the supporting structure, which is conducive to design a compact and simplified button structure, making the products simpler and good looking. Thirdly, an extension line of a connection line between an axial line of the first shaft and the joint intersects with an extension line of the supporting leg extending towards one end where the angle position locking structure is located by using the first axis as a supporting structure, which is equivalent to raise the center of rotation of the button compared to the original design of the applicant. On the one hand, it is advantageous to reduce the height that the button protrudes from the leg shaft sleeve, and allow more part of the button to enter the leg shaft sleeve, so that the products have more beautiful appearance and stronger integrity. On the other hand, the rotation range switches between the locking and releasing states of the button is reduced, a user may switch the state of the button by pressing the button to turn a smaller angle, making it more labor-saving and more manipulative.

The tripod button mechanism provided by the present invention, wherein, the joint is formed by the button being bended downward and towards one end of the angle position locking structure, which is beneficial to improve the force direction of the joint so that the joint is easier to engage with the angle position locking structure to further prevent the occurrence of slipping and gear-off. And a bending position of the button is in the form of a circular transition structure, which is smooth to touch and easy to hand.

The tripod button mechanism provided by the present invention, wherein, the button structure comprises a button seat fixedly arranged on the leg shaft sleeve, and the button is rotatably disposed on the button seat through the first shaft, and the button rotates relative to the button seat to achieve a state switch between jointing with the angle position locking structure and releasing from the angle position locking structure.

The tripod button mechanism provided by the present invention, wherein, the button is formed with a clearance space for preventing the button from abutting against the button seat during rotation. Particularly when the button is switched from the state of releasing from the angle position locking structure to the state of jointing with the angle position locking structure, the button rotates around the first shaft towards the angle position locking structure until the joint of the button joints with the limitation structure of the angle position locking structure to lock the gear of the supporting leg. During this rotation, the side of the button away from the angle position locking structure never abuts against the button seat due to the formation of the clearance space, to prevent the button seat from abutting against the lower portion of this side of the button, and to prevent the button seat from applying a reverse force to the button. Since the extension line of the connection line between the lower portion of the button and the joint does not intersect with the extension line of the supporting leg extending towards one end where the angle position locking structure is located, that is, the supporting force provided by the button seat to the lower part of the button allows the button to have a tendency of rotating towards a direction away from the angle position locking structure.

The tripod button mechanism provided by the present invention, wherein, the joint is in plane contact with the limitation structure, which is favorable to increasing the contact area between the joint and the limitation structure and improving the force uniformity of the joint.

The tripod button mechanism provided by the present invention further comprises a biasing structure for reposition, adapted for acting a biasing force on the button to rotate the button in a direction of jointing with the limitation structure, to reposition the button. The biasing structure is provided so that when the button is driven by pressing or being touched by other components, it is possible to complete more rapid one-time jointing with the angle position locking structure, to reposition the button more quickly and more labor-saving under the biasing force of the biasing structure for reposition.

The tripod button mechanism provided by the present invention, wherein, when the joint joints with the limitation structure, an intersection angle is formed by a connection line between a supporting position of the supporting structure and the joint and a straight line along which the biasing structure applies the biasing force is an acute angle. This arrangement causes the biasing structure for reposition to apply an acting force to the button to allow the button to have a tendency of rotating towards the angle position locking structure, which is advantageous to enhance the close jointing between the joint and the limitation structure to further prevent the occurrence of slipping and gear-off.

The tripod button mechanism provided by the present invention further comprises a button automatic reposition structure, with the help of the abutting between the trigger portion and the blocking portion, the joint of the button may be automatically released from the limitation structure through the upward rotation without the need to press by hand, which is easy to fold the supporting leg upward, or to limit position downward step-by-step or to fold downward.

The tripod button mechanism provided by the present invention, wherein, the trigger portion is elongated, which is advantageous for the trigger portion to be touched by the blocking portion, thus to reposition the button.

The tripod button mechanism provided by the present invention, wherein, the blocking portion is a first limitation structure on the angle position locking structure in the opening direction of the supporting leg, and it is possible to form the blocking portion by using the first limitation structure, instead of providing the blocking portion separately, which is not only beneficial to the simplification and compactness of the overall structure of the button mechanism, but abuts the trigger portion with the first limitation structure for automatically repositioning the button and folding the supporting leg upward.

The tripod button mechanism provided by the present invention, wherein, the angle position locking structure is a profiled gear, which is provided with teeth extending in a radial direction of the profiled gear. Such profiled gear does not need to be milled one by one for each tooth through a milling cutter, instead, it completes the formation of all the teeth by milling at a one-time processing, having simple processing technology and low manufacturing cost, which is advantageous to reduces the manufacture cost of the tripod.

The tripod button mechanism provided by the present invention, wherein, the teeth are arc teeth, and may be in plane contact with the joint of the button, thereby increasing the contact area between the teeth and the joint, improving the uniformity of the force received by the button and further preventing the occurrence of slipping.

The tripod button mechanism provided by the present invention, wherein, the teeth have a circular transition structure at a cusp of the teeth, with this structure, a user is not easy to be scratched, and it is securer and more convenient. In addition, the jointing between the joint and the crenate is easier to form and has less noise during the gear switch process.

The tripod button mechanism provided by the present invention, wherein, a top portion of the profiled gear is in the form of a circular arc surface, so that the trigger portion abuts against the blocking portion, and the joint of the button is caused by the button automatic reposition structure to snap onto the circular arc surface, the coordination between the joint of the button and the circular arc surface of the profiled gear is smoother, which reduces the noise produced in the process of repositioning the button.

The tripod provided by the present invention includes the above-mentioned tripod button mechanism, wherein, the locking state of the supporting leg is not easy to slip and cause gear-off, and the supporting leg has high stability, low manufacturing cost, and the product has simple and beautiful structure, which may be operated comfortably and is labor-saving, to increase the competitiveness.

BRIEF DESCRIPTION OF THE DRAWINGS

In order to more clearly illustrate the specific embodiments of the invention or the technical solutions in the prior art, the following drawings, which are intended to be used in the description of the specific embodiments or the prior art, will be briefly described, and it will be apparent that the following description, apparently, the drawings are some of the embodiments of the present invention, and for those skilled in the art, other drawings may be obtained from these drawings without paying creative work.

Figure 1:
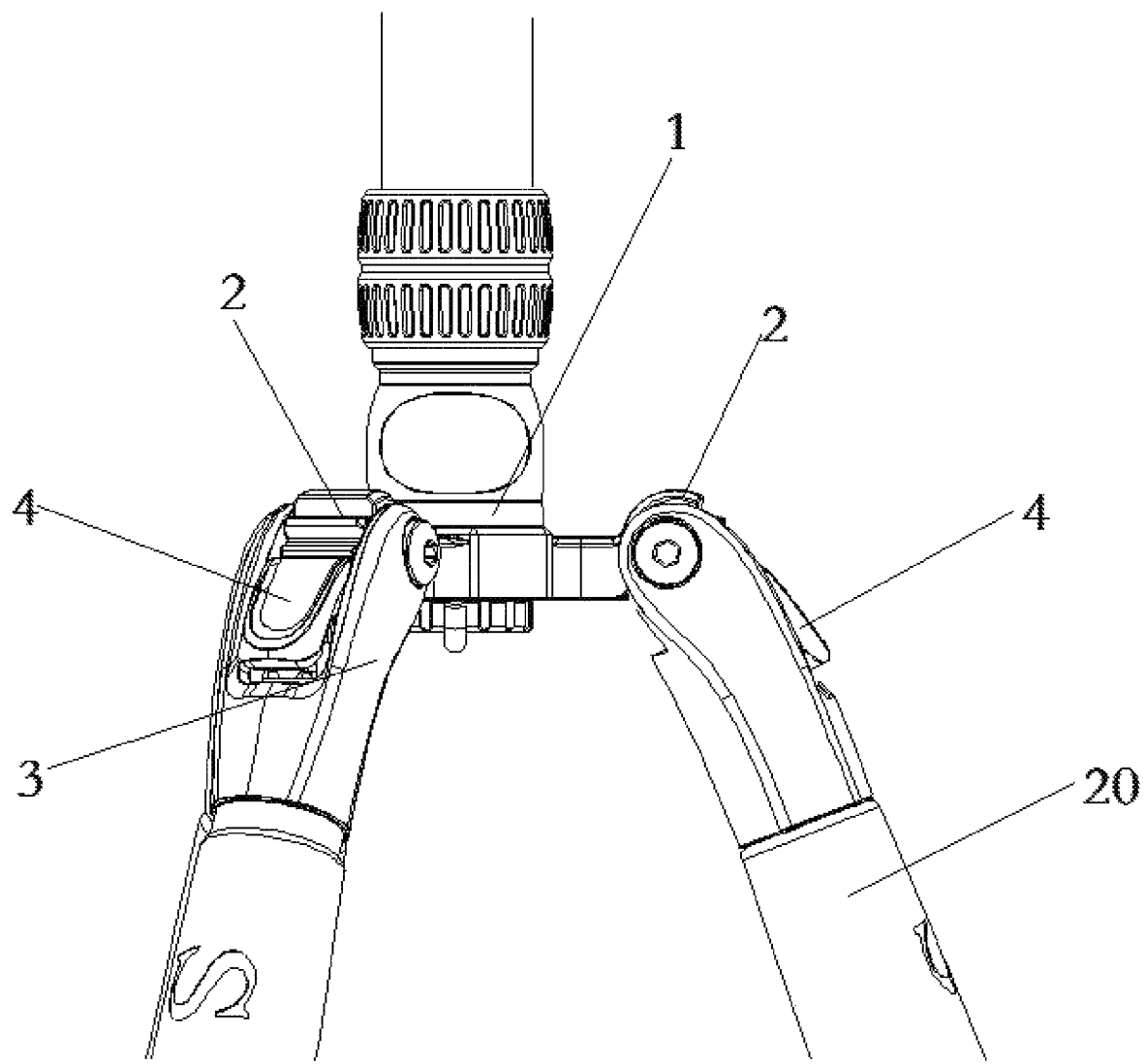
FIG. 1 is a schematic view of a three-dimensional structure of a tripod provided with a tripod button mechanism according to the first embodiment of the present invention.

A description of the reference signs in the drawings is given as below:
- 1—body;
- 2—angle position locking structure;
- 3—leg shaft sleeve;
- 4—button;
- 5—a retaining position locking structure;
- 6—joint;
- 7—abutting portion;
- 8—pressing portion;
- 9—first shaft;
- 10—retaining pin;
- 11—strip-shaped hole;
- 12—second shaft;
- 13—third shaft;
- 14—spring;
- 15—mounting groove;
- 16—trigger portion;
- 17—blocking portion;
- 18—button seat;
- 19—concave surface;
- 20—supporting leg;
- 21—connecting axle;
- 22—connecting axle screw;
- 23—circular notch;
- 24—teeth;
- 25—cusp of the teeth.

DETAILED DESCRIPTION OF EMBODIMENTS

The technical solution of the invention will now be described in detail below with reference to the accompanying drawings, obviously, the described embodiments are part of the present invention, not all the embodiments. Based on the embodiments in the present invention all other embodiments obtained by those skilled in the art without making creative effort are within the scope of the present invention.

In the description of the present invention, the terms "center", "upper", "lower", "left", "right", "vertical", "horizontal", "inside", "outer" indicates that the azimuth or positional relationship is based on the azimuth or positional relationship shown in the accompanying drawings only for the purpose of facilitating and simplifying the description of the invention, rather than indicating or implying that the means or elements referred to must have a specific orientation in a particular orientation and be constructed and operated in a particular orientation, therefore may not be construed to limit the scope of the present invention. In addition, the terms "first", "second", and "third" are provided for purposes of descriptions only and should not be construed to indicate or imply relative importance.

In the description of the present invention, unless otherwise specified and defined, the terms "install", "connect", "connect" should be broadly understood, for example, it may be a fixed connection, a detachable connection, or an integral connection; it may be a mechanical connection or an electrical connection; it may be directly connected or indirectly connected by an intermediate medium, or may be the internal connection of two components. Those skilled in the art understand the specific meaning of the above terms in the present invention considering specific circumstances.

In addition, the technical features described in the different embodiments of the present invention described below may be combined with each other if there is no conflict between them.

Embodiment 1

Figure 2:
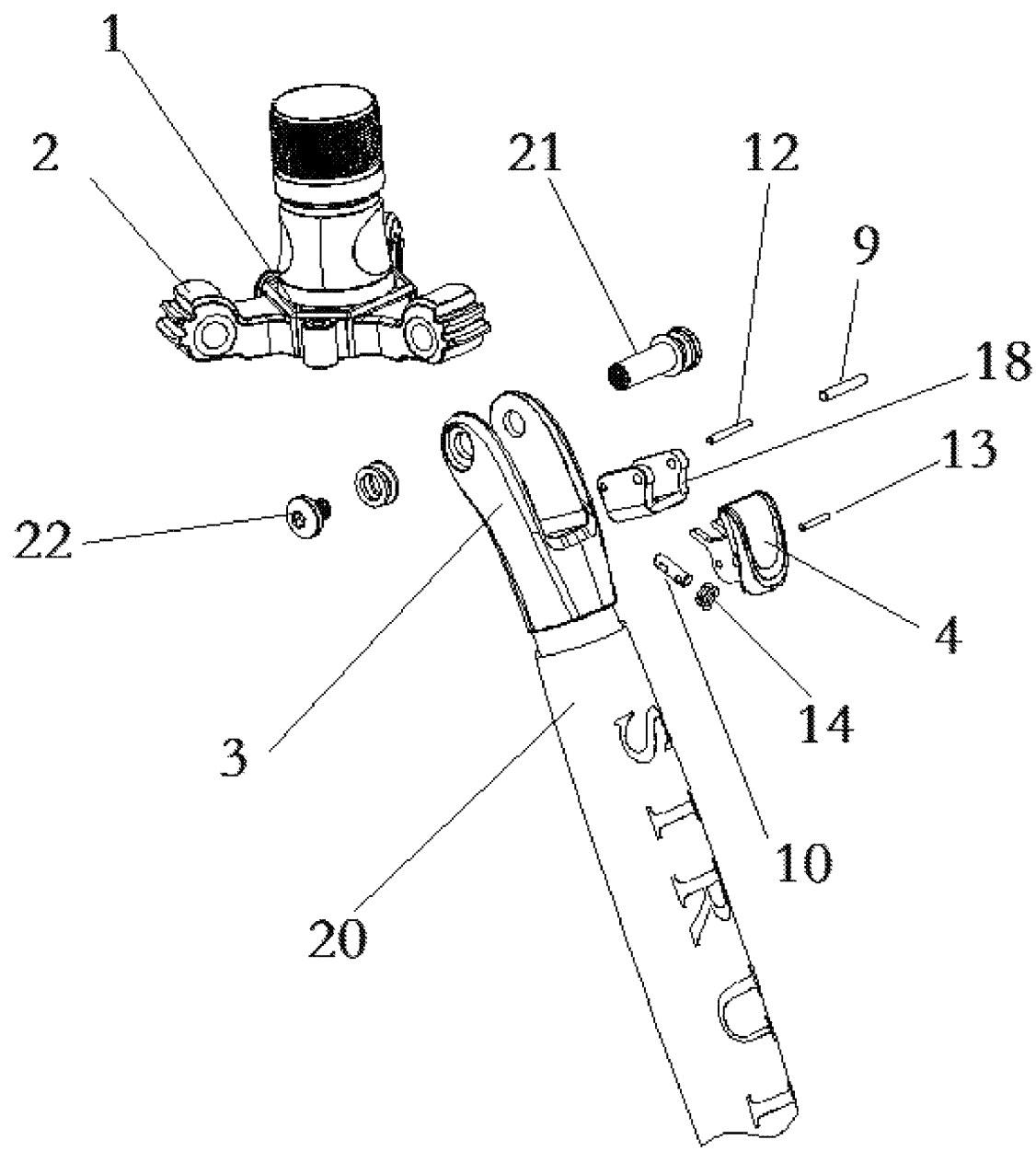
FIG. 2 is an exploded view of the tripod shown in FIG. 1.
Figure 3:
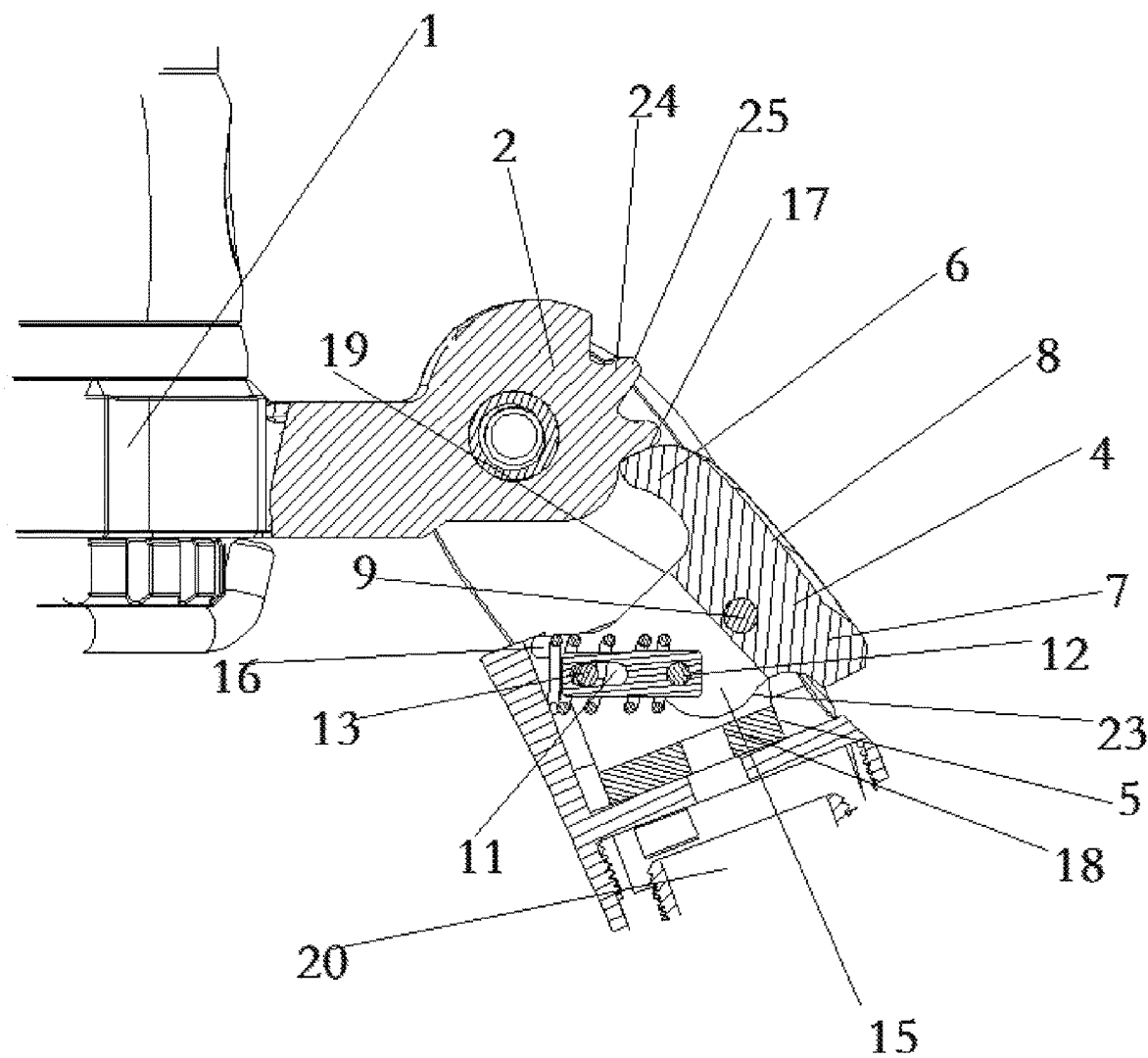
FIG. 3 is a schematic vertical cross-sectional view of the button structure in a state of jointing with the angle position locking structure shown in FIG. 1.
Figure 4:
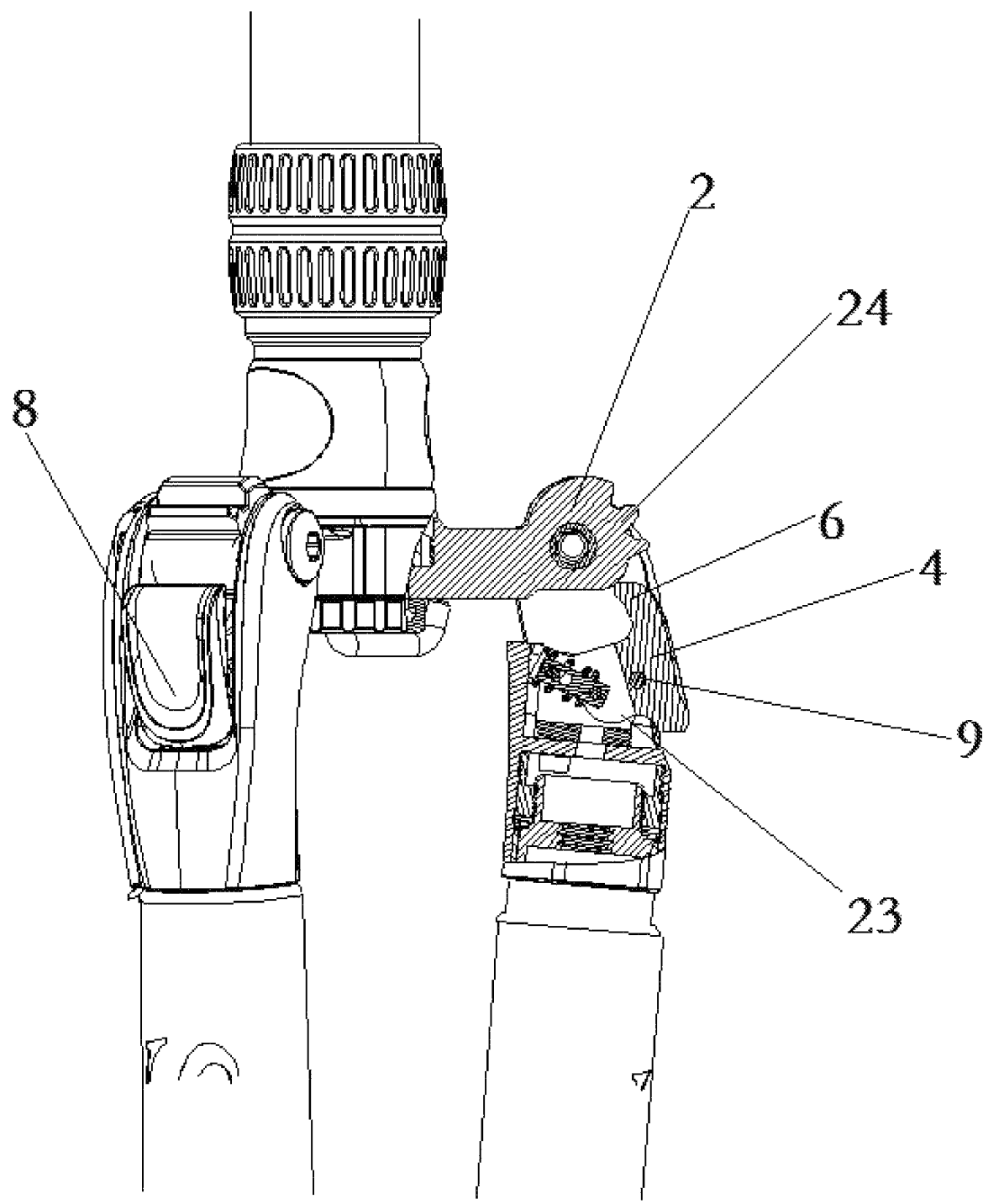
FIG. 4 is a schematic view of a three-dimensional structure of the tripod shown in FIG. 1, where three supporting legs are folded.
Figure 5:
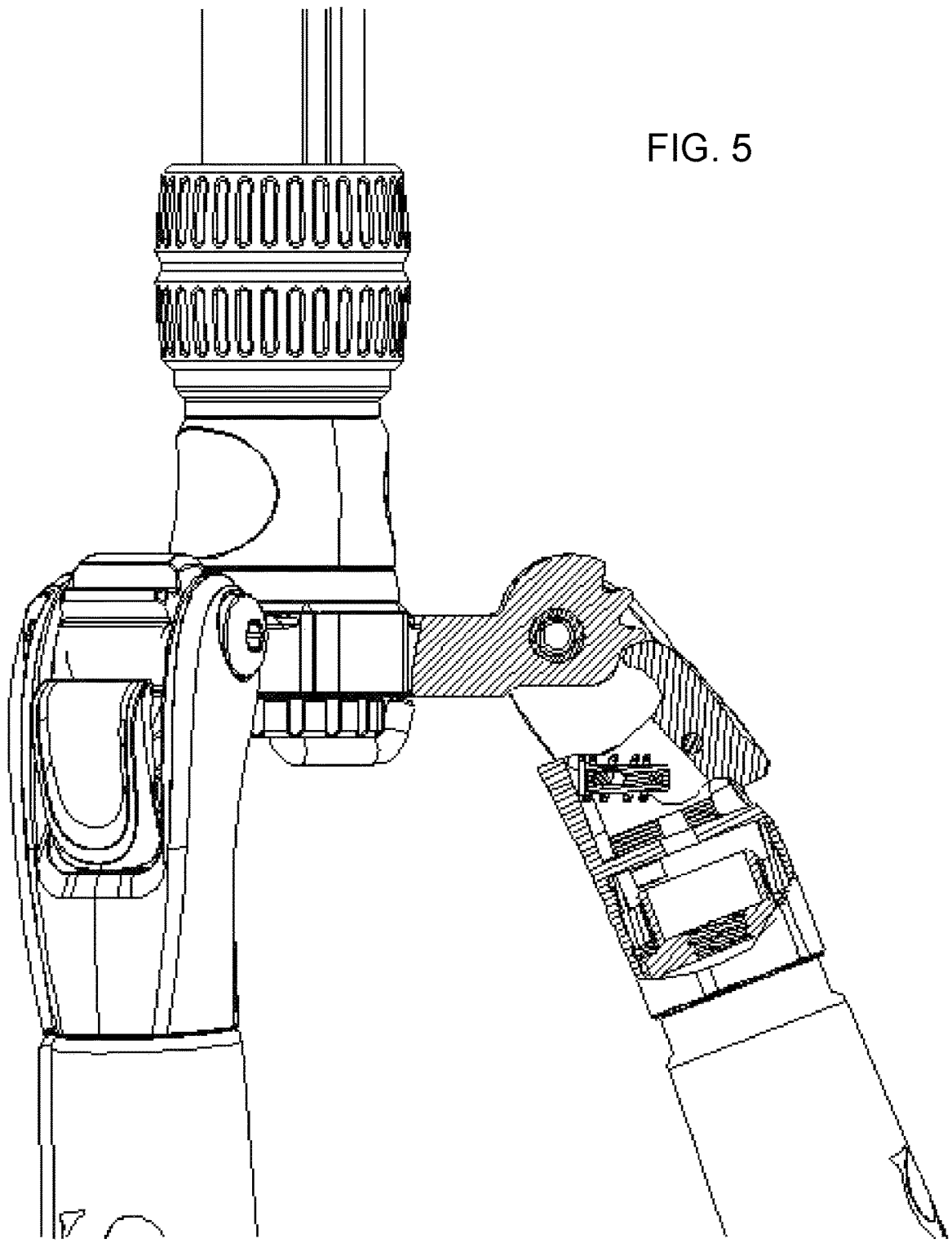
FIG. 5 is a schematic view of a three-dimensional structure of the tripod shown in FIG. 1, where three supporting legs are fixed on the first limitation structure.
Figure 6:
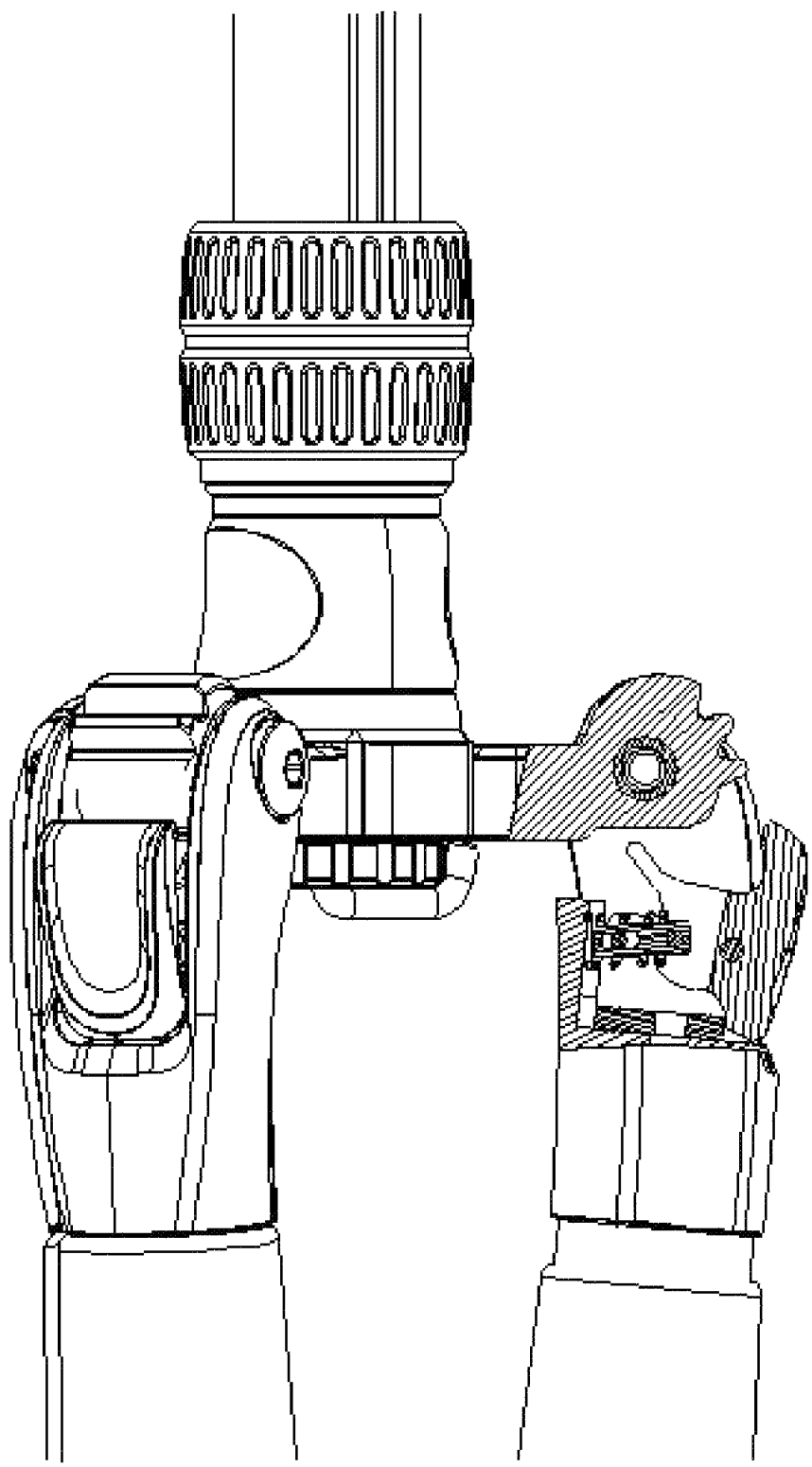
FIG. 6 is a schematic view of a three-dimensional structure of the tripod shown in FIG. 1, where the button of the tripod is limited at a position of the retaining angle position locking structure for keeping the tripod opening.
Figure 7:
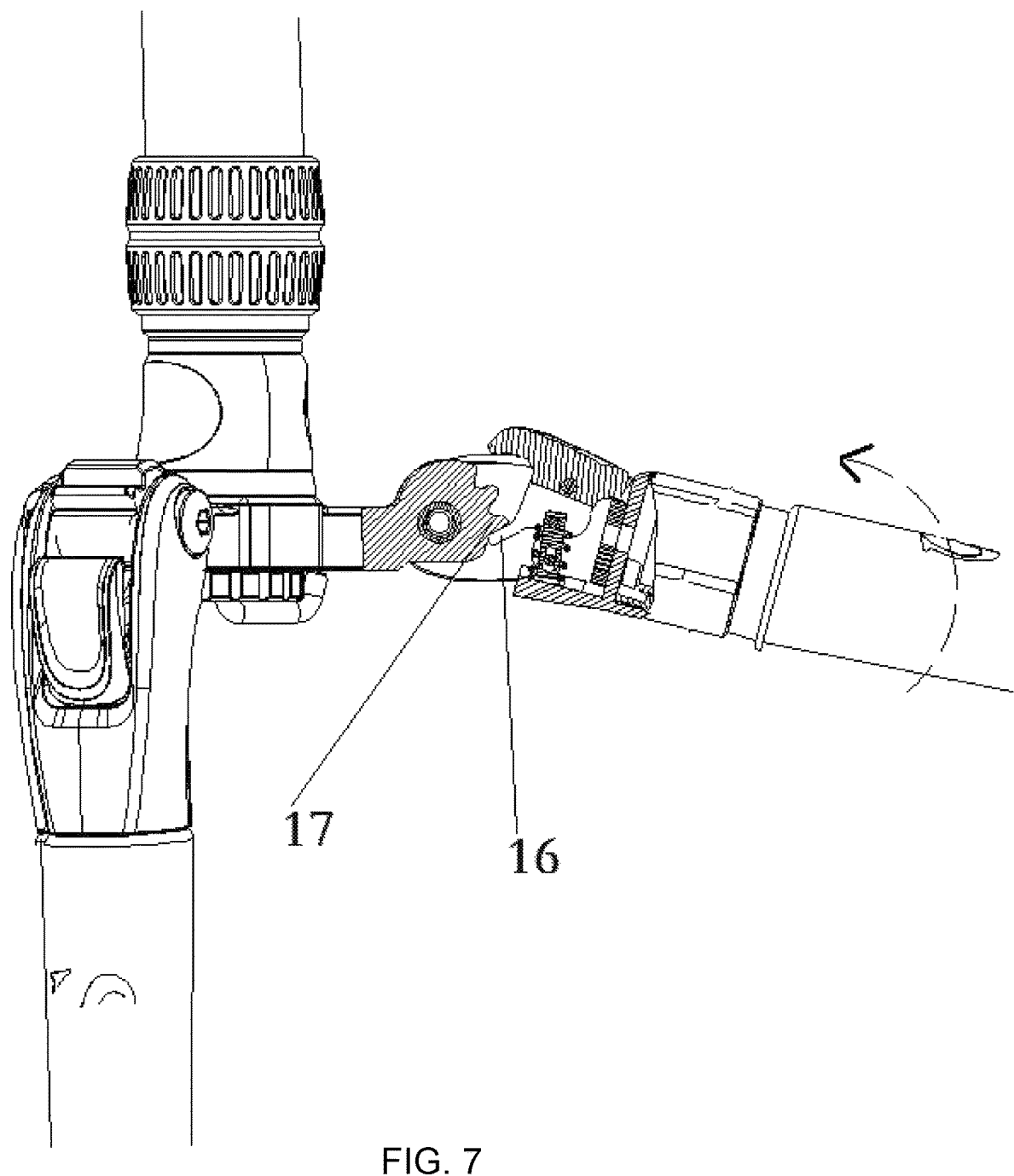
FIG. 7 is a schematic view of a three-dimensional structure of the tripod shown in FIG. 1, where the supporting leg of the tripod rotates to a position where the trigger portion is contacted with the blocking portion (i.e., the first limitation structure)
Figure 8:
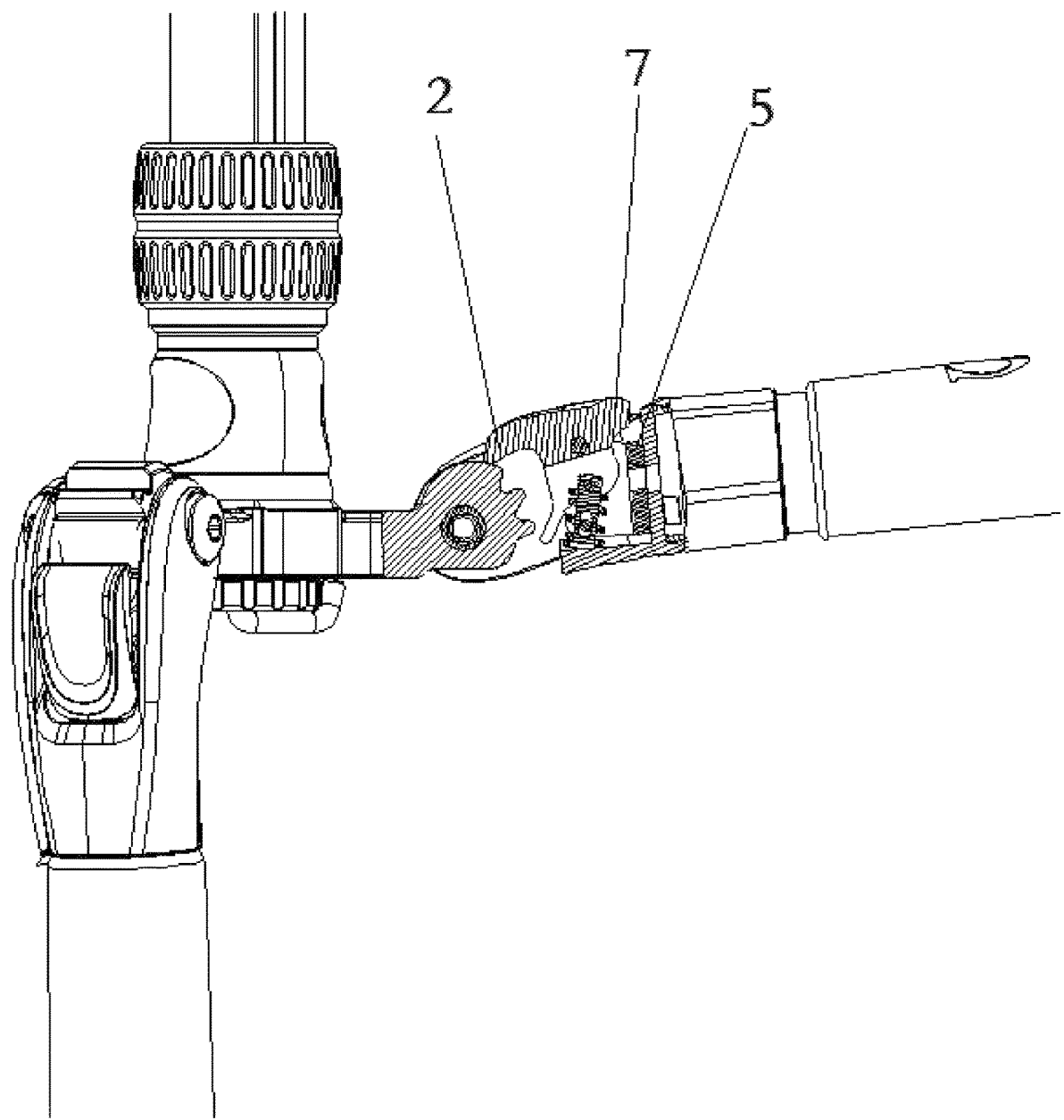
FIG. 8 is a schematic view of a three-dimensional structure of the tripod shown in FIG. 1, where the force reacting by the blocking portion on the trigger portion causes the button to rotate to release the limitation structure of the retaining angle position locking structure to the button.
Figure 9:
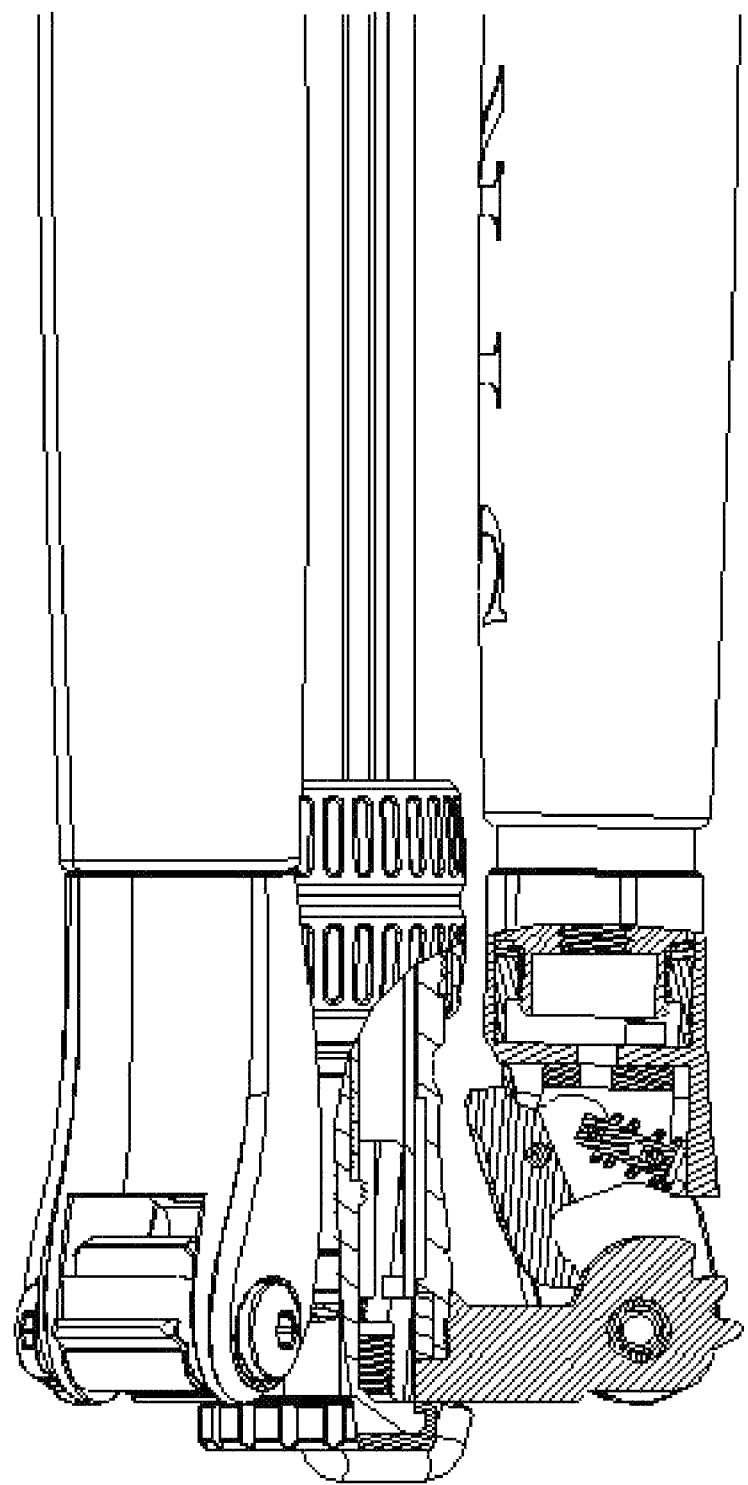
FIG. 9 is a schematic view of a three-dimensional structure of the tripod shown in FIG. 1, wherein the supporting legs of the tripod are folded vertically upward.
Figure 10:
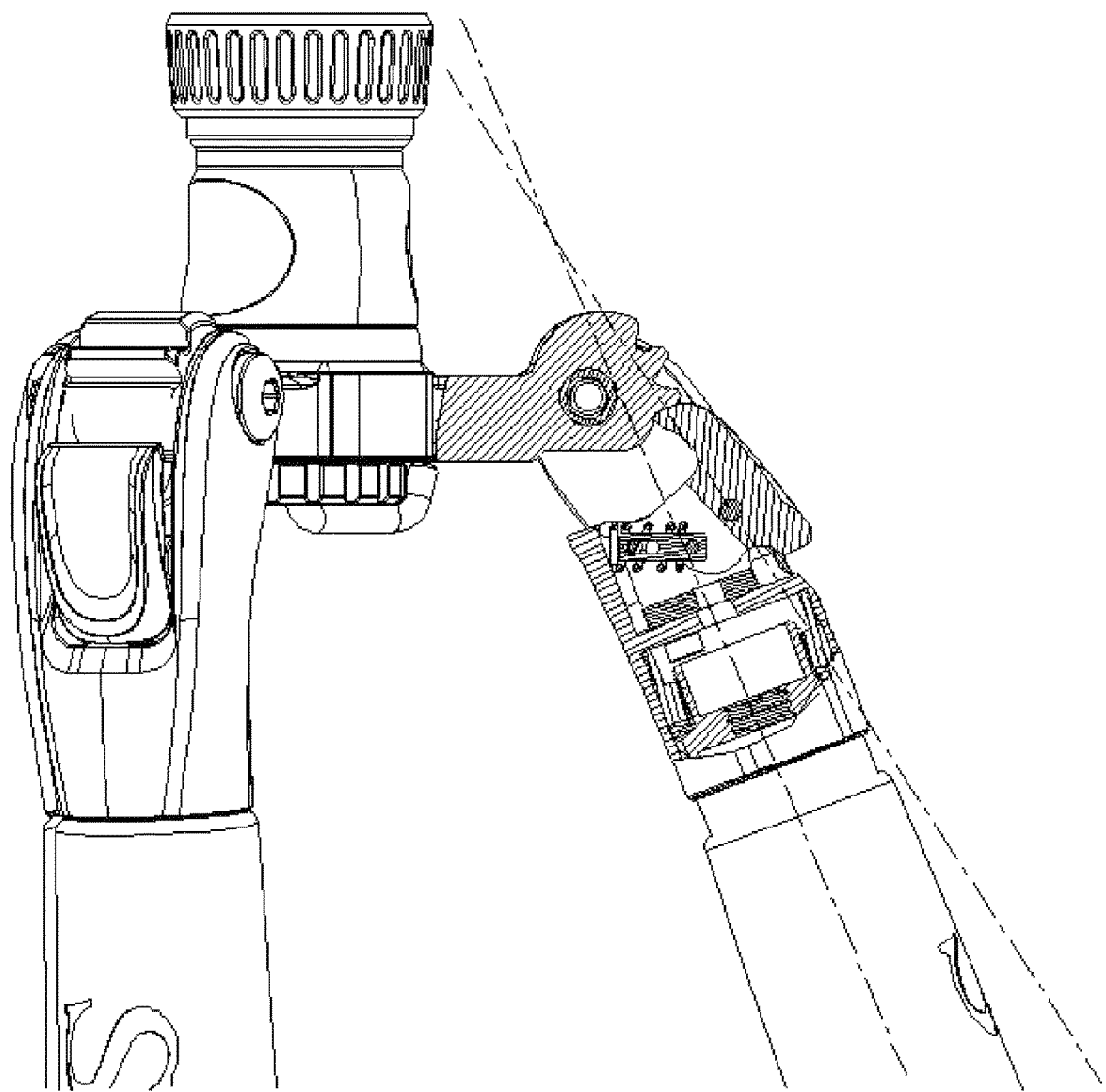
FIG. 10 is a schematic view of the tripod shown in FIG. 1, wherein, an extension line of a connection line between the supporting position of the supporting structure and the joint intersects with an extension line of the supporting leg extending towards one end where the angle position locking structure is located.
Figure 11:
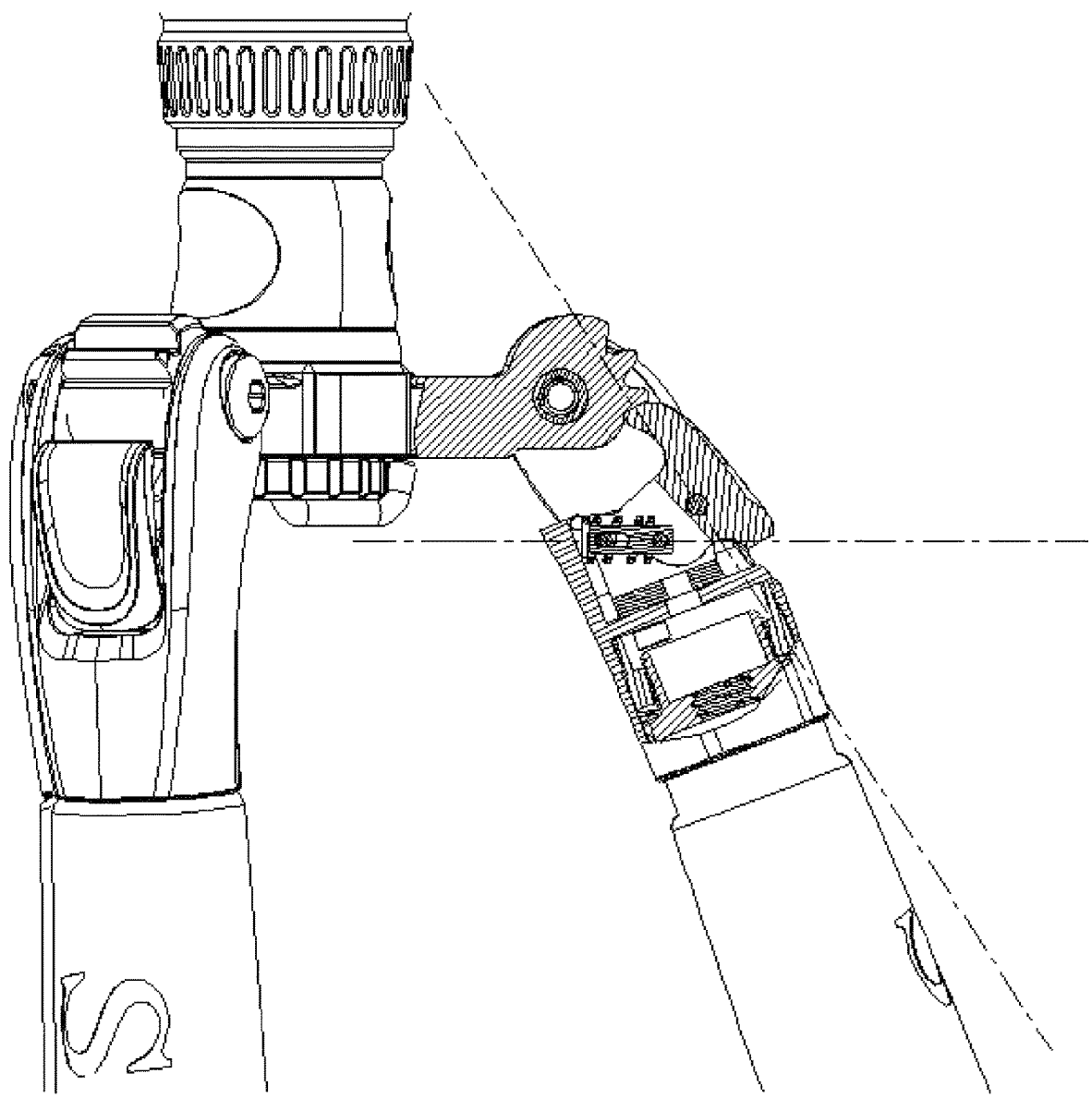
FIG. 11 is a schematic view of the tripod shown in FIG. 1, wherein, an intersection angle, formed by a connection line between a supporting position of the supporting structure and the joint and a straight line along which the biasing structure applies the biasing force, is an acute angle.

FIG. 1 is a schematic view of a three-dimensional structure of a tripod provided with a tripod button mechanism according to the first embodiment of the present invention;

FIG. 2 is an exploded view of the tripod shown in FIG. 1; FIG. 3 is a schematic vertical cross-sectional view of the button structure in a state of jointing with the angle position locking structure shown in FIG. 1; FIG. 4 is a schematic view of a three-dimensional structure of the tripod shown in FIG. 1, where three supporting legs are folded; FIG. 5 is a schematic view of a three-dimensional structure of the tripod shown in FIG. 1, where three supporting legs are fixed on the first limitation structure; FIG. 6 is a schematic view of a three-dimensional structure of the tripod shown in FIG. 1, where the button of the tripod is limited at a position of the retaining angle position locking structure for keeping the tripod opening; FIG. 7 is a schematic view of a three-dimensional structure of the tripod shown in FIG. 1, where the supporting leg of the tripod is rotated to a position where the trigger portion is contacted with the blocking portion (i.e., the first limitation structure); FIG. 8 is a schematic view of a three-dimensional structure of the tripod shown in FIG. 1, where the force reacting by the blocking portion on the trigger portion causes the button to rotate to release the limitation structure of the retaining angle position locking structure to the button; FIG. 9 is a schematic view of a three-dimensional structure of the tripod shown in FIG. 1, wherein the supporting legs of the tripod are folded vertically upward; FIG. 10 is a schematic view of the tripod shown in FIG. 1, wherein an extension line of a connection line between the supporting position of the support structure and the joint intersects with an extension line of the supporting leg extending towards one end where the angle position locking structure is located; FIG. 11 is a schematic view of the tripod shown in FIG. 1, wherein, an intersection angle, formed by a connection line between a supporting position of the supporting structure and the joint and a straight line which the biasing force is applied along by the biasing structure, is an acute angle.

As shown in FIGS. 1-3 and 10, the present embodiment provides a tripod button mechanism, comprising: an angle position locking structure 2, which is fixedly arranged on a body 1 of the tripod; and a button structure, which is disposed on a leg shaft sleeve 3 of the tripod, jointing with the limitation structure of the angle position locking structure 2 to lock a supporting leg 20 of the tripod. And the button structure comprises a button 4 disposed rotatably on a leg shaft sleeve 3 of the tripod through a first shaft 9, and a biasing structure for reposition, adapted for acting a biasing force on the button 4, and further comprises a retaining angle position locking structure 5, which is disposed on a leg shaft sleeve 3, located below the angle position locking structure 2 and is disposed opposite to the angle position locking structure 2. And the joint 6 is formed by an upper end of a pressing portion 8 of the push button 4 that faces the angle position locking structure 2 being bended downward and jointing with the limitation structure of the angle position locking structure 2, with a bending position being in the form of a circular transition structure. And a lower end of the pressing portion 8 that is opposite to the upper end forms an abutment portion 7, and when the lower end of the pressing portion 8 is depressed, the joint 6 is released from the limitation structure, and the abutment portion 7 joints with the retaining angle position locking structure 5.

The tripod button mechanism further comprises a supporting structure, that is, a first shaft 9, which abuts against the button 4 to provide a supporting force for the button 4 in a state where an opening angle of the support leg 20 is locked, and an extension line of a connection line between the supporting position of the first shaft 9 and the joint 6 intersects with an extension line of the supporting leg 20 extended towards one end where the angle position locking structure is located, that is, the supporting force provided by the first shaft 9 for the button directs to an extension line of the supporting leg 20 extended towards one end where the angle position locking structure is located.

The button not only does reciprocating rotation around the first shaft, but also uses the first shaft as a supporting structure, and the first shaft provides supporting for the button in a state where the joint joints with the limitation structure to allow the button to have a tendency of rotating towards the angle position locking structure, which makes the jointing between the button and limitation position more compact, and it is not easy to slip and cause gear-off between the joint and the limitation structure, and the supporting leg is more stable. Secondly, the first shaft is used as a supporting structure, which enhances the usability of the button by changing the force state of the existing structure, there is no need to provide a separate component as the supporting structure, which is conducive to design a compact and simplified button structure, making the products simpler and good looking. Thirdly, an extension line of a connection line between an axial line of the first shaft and the joint intersects with an extension line of the supporting leg extending towards one end where the angle position locking structure is located by using the first axis as a supporting structure, which is equivalent to raising the center of rotation of the button compared to the original design of the applicant. On one hand, it is advantageous to reduce the height that the button protrudes from the leg shaft sleeve, and allow more part of the button to enter the leg shaft sleeve, so that the products have more beautiful appearance and stronger integrity. On the other hand, the rotation range switching between the locking and releasing states of the button is reduced, a user can switch the state of the button by pressing the button to turn a smaller angle, making it more labor-saving and more manipulative.

In addition, the tripod button mechanism further comprises a guiding element for guiding the direction of the biasing force, and a first end of guiding element is connected to the button 4 and a second end being movably connected to the leg shaft sleeve 3, when the button 4 is rotating around the first shaft 9 in the clockwise or counterclockwise direction under external force, the guiding element is driven by the button 4 to rotate counterclockwise or clockwise around the movable joint of the second end of the guiding element in the same plane. And the biasing structure is extensively provided on the guiding element in such a direction that the biasing force is directed from a movable joint of the second end to a direction of the joint of the first end.

After the joint 6 of the button 4 is released from the limitation structure, the abutting portion joints with a retaining position locking structure 5, and the abutting portion keeps at the retaining angle position locking structure 5 under the action of the biasing force provided by the biasing structure for reposition, since the state in which the joint 6 of the button 4 is released from the limitation structure is locking, a user can easily adjust the supporting leg 20 to a desired position by pressing the upper end of the pressing portion 8 to rotate the button 4 for reposition, so that the joint 6 of the button 4 joints with the corresponding limitation structure again to lock the supporting leg 20 to the limitation structure. Therefore, it is very convenient, comfortable, time-saving, and effortless. In addition, since one end of the guiding element is connected to the button 4 and the direction of rotation is away opposite to that of the button 4, it is possible to provide a preload for a plurality of states during the rotation of the button 4 by using only one biasing structure for reposition. For example, when the joint 6 joints with the corresponding limitation structure, the biasing force acts on the button 4 so that the joint 6 of the button 4 is in close contact with the limitation structure, and when the abutting portion joints with the retaining position locking structure 5, the biasing force acts on the button 4 so that the abutting portion is in close contact with the retaining position locking structure 5, thus the tripod mechanism of the present invention is simple, compact and low cost.

In the present embodiment, one end of the guiding element is formed with a shaft hole and the other end is formed with a strip-shaped hole 11, and the strip-shaped hole 11 extends towards the shaft hole. And the guiding element passes through the shaft hole by the second shaft 12 to joint a first end of the guiding element to the button 4, and passes through the shaft hole by the third shaft 13 to movably joint a second end of the guiding element to the leg shaft sleeve 3. Moreover, the direction of the biasing force extends along the axis of the third shaft 13 toward the axial direction of the second shaft 12. Preferably, the biasing structure for reposition is a spring 14, and the guiding element is a retaining pin, and the spring is sleeved on the retaining pin 10, with one end abutting against the second shaft 12 and the other end abutting against the third shaft 13.

Further, the end portion of the button 4 is formed with a mounting groove 15, one end of the retaining pin 10 provided with the shaft hole is provided in the mounting groove 15, and the other end of the retaining pin 10 provided with the stripe hole 11 projects out of the button 4, and the two ends of the second shaft 12 are respectively connected to opposite side walls of the mounting groove 15. Such a structure not only makes the structure simple but also enables the linkage between the button 4 and the guiding element more stable.

The tripod button mechanism of the present embodiment further comprises a button automatic reposition structure, for automatically repositioning the button 4 from the retaining position locking structure 5, and the button automatic reposition structure comprises a trigger portion 16, formed on one side of the button that faces the angle position locking structure 2, and a blocking portion 17, disposed on the angle position locking structure 2; during the process of opening the supporting leg 20, a torque reacted by the blocking portion 17 on the trigger portion 16 is greater than a torque that the biasing force acts on the button 4, and both of the torques have opposite directions so as to overcome the biasing force against the button 4 by the blocking portion 17, so that the pressing portion 8 of the button rotates towards the angle locking position 2 to reposition the button 4, and the abutting portion 7 of the button is separated from the retaining angle position locking structure 5, and the joint 6 of the button 4 is in close contact with the upper circular arc surface of the angle locking position 2. In the present embodiment, the trigger portion 16 may be a convex angle formed on the button.

The trigger portion 16 is elongated.

As shown in FIG. 11, when the joint 6 joints with the position locking structure of the angle position locking structure 2, an intersection angle is formed by a connection line between a supporting position of the supporting structure and the joint 6 and a straight line which the biasing force is applied along by the biasing structure is an acute angle, which causes the biasing structure for reposition to apply an acting force to the button 4 to allow the button 4 to have a tendency of rotating towards the angle position locking structure 2, which is advantageous to enhance the close joint between the joint 6 and the limitation structure to further prevent the occurrence of slipping and gear-off.

To make the overall structure simpler and compacter, the blocking portion 17 is formed by a first limitation structure of the angle position locking structure 2.

The abutting portion 7 is a projection portion, and the retaining angle position locking structure 5 is formed by a stepped plane formed on the leg shaft sleeve 3. And the leg shaft sleeve 3 is further provided with a button seat 18, on which the button structure is mounted, to facilitate the formation of the leg shaft sleeve 3 and the installation of the button structure. In the present embodiment, it is preferable that the button seat 18 has a bottom surface and two opposite side walls disposed perpendicularly to the bottom surface, and the bottom surface of the button seat 18 is in contact with the end face of the leg shaft sleeve 3. Both ends of the first shaft 9 and both ends of the third shaft 13 are fixed to the opposite side walls of the button seat 18, respectively, and the step surface is formed by the end of the button seat 18 and the end face of the leg shaft sleeve.

The button 4 is formed with a clearance space for preventing the button 4 from abutting against the button seat 18 during rotation, and the clearance space is a circular notch 23 formed on one side of the button 4 away from the angle position locking structure. Particularly when the button is switched from the state of releasing from the angle position locking structure to the state of jointing with the angle position locking structure, the button rotates around the first shaft toward the angle position locking structure until the joint of the button joints with the limitation structure of the angle position locking structure to lock the gear of the supporting leg. During this rotation, the side of the button away from the angle position locking structure never abuts against the button seat due to the formation of the clearance space, to prevent the button seat from abutting against the lower portion of this side of the button, and to prevent the button seat from applying a reverse force to the button. Since the extension line of the connection line between the lower portion of the button and the joint does not intersect with the extension line of the supporting leg extending towards one end where the angle position locking structure is located, that is, the supporting force provided by the button seat to the lower part of the button allows the button to have a tendency of rotating towards a direction away from the angle position locking structure.

The angle position locking structure 2 is a profiled gear, which is provided with teeth 24 extending in a radial direction of the profiled gear. Such profiled gear does not need to be milled one by one for each tooth 24 through a milling cutter, instead, it completes the formation of all the teeth by milling at a one-time processing, having simple processing technology and low manufacturing cost, which is advantageous to reduce the manufacture cost of the tripod.

The teeth 24 are arc teeth, the portion where the joint 6 is in contact with the profiled gear is a plane, and the portion where the trigger portion 16 is in contact with the first limitation structure is a plane as well, which increases the contact areas, improves the uniformity force, and further prevents the occurrence of slipping, and increases the durability of profiled gear by means of the abutting cooperation between the planes.

The teeth 24 have a circular transition structure at a cusp 25 of the teeth, thus a user is not easy to be scratched, and it is securer and more convenient.

A top portion (a portion where a limitation structure is not provided) of the profiled gear is in the form of a circular arc surface, so that when the trigger portion 16 abuts against the blocking portion 17 to rotate towards a direction of the limitation structure, to reposition the button, the coordination between the joint of the button and the circular arc surface of the profiled gear is smoother, which reduces the noise produced in the process of repositioning the button. To ensure that the button 4 may be rotated 180 degrees around the angle locking position structure 2 without interference, a concave 19 is formed between the joint 6 and the trigger portion 16, and the bottom of the profiled gear is provided as a plane, to avoid the interference with the rotation of the button 4.

The present embodiment also provides a tripod having the tripod button mechanism described above, which operates as follows:

As shown in FIG. 4, the supporting leg 20 of the tripod is in a vertically downward folded state, and when the tripod is required to be opened, the supporting leg 20 may be pulled outward so that the joint 6 of the button 4 joints with first limitation structure, which is shown in FIG. 5. Then the lower end of the pressing portion 8 is pressed with the finger, and the button 4 rotates in the direction from the first shaft towards the retaining angle position locking structure 5 against the biasing force of the spring, to release the joint 6 from the first limitation structure, then the abutting portion contacts with the retaining angle position locking structure 5. Meanwhile, the direction of the biasing force of the spring 14 changes with the rotation of the retaining pin, and the direction of the biasing force of the spring 14 changes to the direction that the spring abuts against the button 4 so that the abutting portion 7 is in close contact with the retaining angle limitation structure 5. As shown in FIG. 6, at this point, the button is kept at the retaining locking position 5, a user can easily adjust the supporting leg to a desired limitation structure, and then press the upper end of the pressing portion 8, then the button 4 rotates in the direction from the first shaft towards the retaining position locking structure 5 to release the abutting portion 7 from the retaining locking position 5, and then the joint 6 joints with a selected limitation structure on the angle locking position structure 2, meanwhile, the direction of the biasing force of the spring 14 changes with the rotation of the retaining pin, and the direction changes to a direction that the spring abutting against the button 4 so that the abutting portion 7 is in close contact with the corresponding limitation structure.

Of course, when the button 4 is kept at the retaining locking structure 5, it is also possible to automatically reposition the button 4 by the button automatic return structure, as shown in FIG. 7, it is only necessary to continue to pull the supporting leg 20 outward until the trigger portion 16 abuts against the blocking portion 17 (the first limitation structure serves as the blocking portion 17 in the present embodiment), so that the button rotates in the direction towards the angle position locking structure, and the abutting portion 7 is released from the retaining locking structure 5, as shown in FIG. 8. At this moment, the supporting leg 20 may be pulled up to a vertically upward folded state, as shown in FIG. 9.

When the supporting leg 20 is in the upward folded state and is required to be open, a user can directly pull the supporting leg 20 downward, and the joint 6 of the button slides into the third locking position along the circular arc surface of the angle position locking structure 2, and the supporting leg 20 is fixed at the third limitation structure and a user can further pull the supporting leg 20 inwardly, then the joint 6 sequentially slides into the second limitation structure, the first limitation structure, and the supporting leg 20 may be successively fixed at the second limitation structure, the first limitation structure until supporting leg 20 is finally folded vertically, which is very convenient and labor-saving.

As an alternative embodiment of the first embodiment, when the button is switched from the state of releasing from the angle position locking structure to the state of jointing with the angle position locking structure, the button rotates around the first shaft towards the angle position locking structure until the joint of the button joints with the limitation structure of the angle position locking structure to lock the gear of the supporting leg. And the upper end of one side of the button away from the angle position locking structure abuts against the button seat, and the extension line of the connection line between the upper end of the button and the joint intersects with the extension line of the supporting leg extending towards one end where the angle position locking structure is located to form the supporting structure. It should be noted that the upper end does not interfere with the rotation of the button during the state switching process.

As an alternative embodiment of the first embodiment, the joint is formed by the button being bended downward and towards one end of the angle position locking structure, with a bending position being in the form of a circular transition structure or a folding line transition structure.

As an alternative embodiment of the first embodiment, the clearance space is a notch in any shape formed on one side of the button away from the angle position locking structure.

As an alternative embodiment of the first embodiment, the tooth surface of the teeth of the profiled gear is a plane.

As an alternative embodiment of the first embodiment, the tooth surface of the teeth of the profiled gear is a plane and the teeth have a circular transition structure at a cusp of the teeth.

As an alternative embodiment of the first embodiment, contact between the joint and the tooth surface of the teeth, and the contact between the trigger portion and the tooth surface of the teeth is a point contact, a line contact, or a plane contact.

As an alternative embodiment of the first embodiment, the trigger portion is a sheet-like shaped or hook-like shaped or with any other shapes that do not interfere with the rotation of the button.

As an alternative embodiment of the first embodiment, the blocking portion is a projecting portion formed at the lower portion of the first limitation structure.

As an alternative embodiment of the first embodiment, the angle position locking structure is not limited to three kinds of limitation structures, and a plurality of limitation structures may be adopted according to specific needs.

It is obvious that the above-described embodiments are merely illustrative of the examples given and are not intended to limit the way it is implemented. It will be apparent to those skilled in the art to make various other changes or variations based on the above description. There is no need and it is not possible to exhaust all the implementation herein. And the obvious changes or variations that have been extended are still within the scope of protection of the present invention.

What is claimed is:

1. A tripod button mechanism comprising:
a tripod having a body connecting to at least one supporting leg;
an angle position locking structure fixedly arranged on the body of the tripod and being connected, via a leg shaft sleeve and a connecting axle, to the at least one supporting leg at a distal end of the at least one supporting leg;
a button structure comprising a biasing structure, a button and a button seat, said button disposed rotatably within the button seat and the leg shaft sleeve of the tripod through a supporting structure, wherein, the button has a front joint disposed on a first end of the button for engaging a limitation structure of the angle position locking structure, said button further comprising a pressing surface disposed away from the first end of the button, an abutting portion disposed on a distal end of the pressing surface, a button end portion which is disposed underneath a circular notch of the abutting portion, and a trigger portion,
wherein, in a first state when the front joint is engaged with the limitation structure and when no pressing force is applied to the pressing surface, no portion of the button end portion engages the button seat;
wherein, in a second state when the pressing force is applied to the pressing surface, the front joint disengages the limitation structure and the abutting portion rotatably engages a retaining position locking structure of the button seat via the supporting structure, and is the only element of the button that engages the retaining position locking structure of the button seat, and
wherein, in transitioning from the second state to the first state, in response to a rotational force for rotating the supporting leg about the connecting axle, the trigger portion engages the limitation structure, wherein the rotational force is greater than the biasing force to cause the front joint to rotatably re-engage another limitation structure of the angle position locking structure via the supporting structure, wherein the button end portion continues to be free from engaging the button seat while transitioning from the second state to the first state.

2. The tripod button mechanism according to claim 1, wherein the front joint is curved downward and toward one end of the angle position locking structure.

3. The tripod button mechanism according to claim 1, wherein the button seat is fixedly arranged on the leg shaft sleeve, and the button is rotatably disposed on the button seat through the supporting structure.

4. The tripod button mechanism according to claim 3, wherein the button is formed with a clearance space for preventing the button from abutting against the button seat during rotation.

5. The tripod button mechanism according to claim 1, wherein the trigger portion comprises a tip section that engages a surface of the limitation structure.

6. The tripod button mechanism according to claim 1, wherein the angle position locking structure is a profiled gear, which is provided with teeth extending in a radial direction of the profiled gear.

7. The tripod button mechanism according to claim 6, wherein the teeth comprise a shape of an arc.

8. The tripod button mechanism according to claim 6, wherein the teeth have a circular transition structure at a cusp of the teeth.

9. The tripod button mechanism according to claim 6, wherein a top portion of the profiled gear is in the form of a circular arc surface, so that the trigger portion abuts against a blocking portion, and the front joint of the button is caused by a button automatic reposition structure to snap onto the circular arc surface.

10. A tripod having at least one leg comprising:
an angle position locking structure comprising a profiled gear fixedly arranged on a body, wherein the profiled gear provides teeth extending in a radial direction thereof; and
an automatic repositioning button mechanism comprising:
a biasing structure;
a button;
a button seat;
wherein the button and the biasing structure are disposed rotatably within the button seat and a leg shaft sleeve through a supporting structure,
wherein, the button comprises a front joint disposed on a first end of the button for engaging one of the teeth of the angle position locking structure,
wherein the button further comprising a pressing surface, an abutting portion disposed on a distal end of the pressing surface, a button end portion disposed underneath a circular notch disposed underneath the abutting portion, and a trigger portion,
wherein, in a first state when the front joint is engaged with the one of the teeth and when no pressing force is applied on the pressing surface, no portion of the button end portion engages the button seat;
wherein, in a second state when the pressing force is applied to the pressing surface, the front joint disengages the one of the teeth and the abutting portion rotatably engages a retaining position locking structure of the button seat via the supporting structure, wherein the biasing structure creates a biasing force to maintain the abutting portion at the retaining position locking structure without continuous presence of the pressing force on the pressing surface; and
wherein, in transitioning from the second state to the first state, in response to a rotational force for rotating the leg, the trigger portion engages another one of the teeth, wherein the rotational force is greater than the biasing force to cause the front joint to rotatably re-engage either the one of the teeth or a third one of the teeth of the angle position locking structure and the abutting portion disengages the retaining position locking structure via the supporting structure, wherein the button end portion continues to be free from engaging the button seat while transitioning from the second state to the first state.

11. The tripod according to claim 10, wherein:
the teeth comprise a circular transition structure at a cusp of the teeth; and
a top portion of the profiled gear is in the form of a circular arc surface.

12. The tripod according to claim 10, wherein the supporting structure comprises a shaft for supporting rotational movement of the button disposed in the button seat.

13. The tripod according to claim 11, wherein, in transitioning from the second state to the first state, the rotational force acts to cause the front joint to rotatably engage the top portion of the profiled gear before re-engaging the another one of the teeth.

14. A tripod comprising:
a body connecting to at least leg; and
an automatic repositioning button mechanism comprising:
a biasing structure;
a button;
a button seat;
wherein the button is disposed rotatably within the button seat and a leg shaft sleeve of the tripod through a supporting structure of the button,
wherein, the button comprises a front joint disposed on a first end of the button for engaging one of the teeth of an angle position locking structure fixedly arranged on the body of the tripod, said front joint comprising a curved tip, said teeth extending radially, wherein each of the teeth comprises a circular transition structure cusp;
wherein the button further comprising a pressing surface, an abutting portion disposed on a distal end of the pressing surface, a button end portion disposed underneath a circular notch disposed underneath the abutting portion, and a trigger portion,
wherein, in a first state when the front joint is engaged with the one of the teeth and when no pressing force is applied on the pressing surface, no portion of the button end portion engages the button seat;
wherein, in a second state when the pressing force is applied to the pressing surface, the front joint disengages the one of the teeth and the abutting portion rotatably engages a retaining position locking structure of the button seat via the supporting structure, wherein the biasing structure creates a biasing force to maintain the abutting portion at the retaining position locking structure without continuous presence of the pressing force on the pressing surface; and
wherein, in transitioning from the second state to the first state, in response to a rotational force for rotating the leg, the trigger portion engages another one of the teeth, wherein the rotational force is greater than the biasing force to cause the front joint to rotatably re-engage the one of the teeth or a curved surface of the angle position locking structure and the abutting portion disengages the retaining position locking structure via the supporting structure, wherein the button end portion continues to be free from engaging the button seat while transitioning from the second state to the first state.

15. The automatic repositioning button mechanism according to claim 14, wherein the supporting structure comprises a shaft for supporting rotational movement of the button disposed in the button seat.

16. The automatic repositioning button mechanism according to claim 14, wherein the front joint slidably engages along the curved surface of the angle position locking structure.

17. The automatic repositioning button mechanism according to claim 14, wherein in transitioning from the second state to the first state, the rotational force acts to cause the front joint to rotatably engage the top portion of the angle position locking structure before reengaging the another one of the teeth.

\* \* \* \* \*